350-382 SR
XR 3,664,737
SEARCH ROOM

PRINTING PLATE RECORDING BY DIRECT EXPOSURE

Filed March 23, 1971 3 Sheets-Sheet 1

INVENTOR
JAMES LIPP

BY Thomas F. Dalvin
AGENT

3664737
OR IN 355/18

United States Patent Office 3,664,737
Patented May 23, 1972

3,664,737
PRINTING PLATE RECORDING BY DIRECT EXPOSURE

James Lipp, Poughkeepsie, N.Y., assignor to International Business Machines Corporation, Armonk, N.Y.

Filed Mar. 23, 1971, Ser. No. 127,094
Int. Cl. G03b *27/70*
U.S. Cl. 355—18 12 Claims

ABSTRACT OF THE DISCLOSURE

A laser beam in the actinic region of electromagnetic spectrum is used to provide direct exposure of printing plates. The plates have a coating of a photosensitive medium, preferably a diazo, which is sensitive to the actinic wavelength. The vertical deflection of the laser beam is controlled by digital light deflection apparatus which provide a raster of discrete, essentially diffraction-limited spots of light along a single line.

In the preferred embodiment, the particular beam trace on the photosensitive medium is determined by computer control of the digital light deflector; and horizontal displacement of the vertical lines transversely on the photosensitive medium is accomplished by light coupling means which reciprocates across the plane of the medium.

CROSS-REFERENCE TO RELATED APPLICATIONS

This application incorporates by reference applications Ser. No. 814,240, filed Apr. 7, 1969 and now Pat. No. 3,584,933 entitled "Light Deflection Apparatus" by M. A. Habegger et al., and Ser. No. 102,574, filed Dec. 30, 1970 entitled "Light Deflection Apparatus" by J. Lipp. Both of these applications are assigned to the assignee of the present application.

BACKGROUND OF THE INVENTION

Field of the invention

This invention relates to the fabrication of printing plates which are used to reproduce the text or illustrations printed thereon. In particular, it relates to a system for preparing plates of the exposure-offset type.

Description of the prior art

Offset printing has been recognized as an economical method for producing a large number of copies of data which must be distributed to many thousands of locations. The most often used systems for offset printing involve phototypesetting or the preparation of photocopies of documents which have been mechanically prepared to produce an image on an offset printing plate.

Phototypesetting is one system which is capable of economic production of large quantities. However, the present phototypesetting systems make use of an intermediate photographic film master which is then used to transfer the required data onto an offset printing plate. This process is slow and requires many manual production steps which at present take several days to complete. The problem is compounded when there is a need to make last-minute changes in the documents.

In addition to offset systems, it has been suggested that high quality relief-type plates might be manufactured by using radiation of high energy to engrave or etch the plate. The engraved patterns would consist of minute projections or holes, forming a pattern in which the holes are not distinguishable to the human eye.

The input radiation would emanate from lasers or electron guns having beams of around one micron and with sufficient power density to cut or evaporate material from a plate. In general, the laser has superseded the electron gun in this field because of its widespread availability and relative ease of application. See, for example, "Laser-Etched Printing Plates . . . ," Inland Printer/American Lithographer, December 1964, pages 57 and 113 by W. T. Reid and "Helium-Neon Laser: Thermal High-Resolution Recording," Science, December 1966, pages 1550–51. In the Reid article it is suggested that a computer be used to control the movement of the plate vertically and also to synchronize the laser action to etch intelligible information onto the plate.

In practice, however, these proposals have enjoyed limited success because they are, in fact, slower than the chemical etching art. The laser power required at a given spot is quite high and the heat generated is also high. The material must be completely vaporized for an interval sufficient to ensure its removal. Consequently, there is a great quantity of thermal energy transferred to the surrounding area which must be removed before another spot can be etched. At present, the art has not progressed to the level where the thermal energy can be removed quickly enough to enable laser etching to compete in speed with chemical etching.

In addition to slowness in production, the plates produced to date by laser etching have been unacceptably irregular and lacking in definition. This is also thought to be due to the thermal gradients generated in the printing plate material by the laser beam.

Some attempts have been made to utilize photochemical processes for forming characters on a printing plate. In these systems a laser beam, which emits radiation below 0.6 micron, exposes a photopolymer such as "Dycril," a registered trademark of the E. I. du Pont Corporation. To form a character, the light beam is deflected both horizontally and vertically across the printing medium. This process is theoretically capable of providing a small spot of high resolution. In addition, very little power is required to expose the photopolymer.

However, these prior art systems have not been commercially successful. This has been due primarily to an inability to produce numerous small contiguous spots with high resolution. This ability is absolutely necessary to enable a laser printing system to compete with other character printing systems.

The principal problem in the prior art systems has been the means used to deflect the laser beam in a vertical path. In the best of these systems, the light deflection means have comprised electro-optic and birefringent materials which serve to selectively transmit one polarization state of a light beam having two mutually orthogonal states. By placing these elements in series, a single initial laser beam can be deflected into $2^n$ output points, where $n$ is the number of polarization control elements. However, these prior art systems are not capable of providing output light which is nearly diffraction-limited. In most systems the rays of the light beam have a tendency to diverge, thereby taking up more area than is present in the original laser beam. In addition, these beams have a tendency to be astigmatic, whereby rays in the tangential plane focus at a different location along the system's longitudinal axis from the rays imaged in the orthogonal sagittal plane. Hence, in practice, the capability of producing a small, high resolution light spot has not evolved into a feasible character printing system which requires thousands of diffraction-limited and accurately positioned spots on a photosensitive medium.

Notwithstanding the defects in present laser printing systems, the laser remains the most promising tool in producing high-resolution plates efficiently and relatively quickly.

It is therefore an object of this invention to improve the production of high quality printing plates.

It is a further object of this invention to improve the method by which a deflected laser beam forms patterns in a photosensitive medium.

SUMMARY OF THE INVENTION

In the present invention a laser beam having a wavelength in the actinic (UV) region of the electromagnetic spectrum is used to expose a photosensitive medium which is sensitive to that wavelength.

A convergent beam from the laser is first passed through a digital light deflector to selectively generate spots of light in a vertical line at an output plane. The deflector can generate spots in consecutive sequence or at random. The vertical line remains at a constant position in the output plane; horizontal displacement of the line is provided by a light coupling system which reciprocates orthogonally with respect to the vertical line thereby moving the vertial line horizontally across the photosensitive printing plate.

The light deflection apparatus comprises two distinct and different sets of deflectors. Both sets comprise a number of digitally indexed, fast acting, crystal deflectors in which the light beam is controlled by electro-optic switches.

A deflection stage of the first set is capable of yielding diffraction-limited output beams and providing minimum separation between adjacent positions of the deflected output beams. The separation is ordinarily limited only by Rayleigh's criterion and may be termed a diffraction-limited separation. Light deflection apparatus to perform these functions is well known to those of skill in this art; e.g., split angle (SA) deflectors may be used.

It is known, however, that SA deflectors introduce astigmatic aberrations in one of the two possible convergent beams in each deflection stage. These aberrations become pronounced as the pathlength of the deflectors increases. The diffraction patterns due to astigmatic aberration become distorted and greatly increased in spot diameter. This factor has precluded the development of a practical light deflection system of, say, 8 stages. Therefore, in this invention, the number of deflection stages in the first set is limited. In practice, not more than four stages are used.

The second set of deflectors completes the system. Each stage of the second set is a total internal reflection (TIR) deflector. These deflectors yield diffraction-limited output spots of light for any number of stages. I have discovered, however, that a deflection system comprising only TIR deflectors is not commercially practical because the minimum separation between adjacent positions of the deflected beams is too large. So, for example, in an 8-stage deflector used for printing, the pattern of diffraction-limited spots formed when using only TIR deflectors is not sufficiently dense to create a fine pattern.

In this invention, I use both kinds of deflectors in cascade. The SA deflector stages initially provide a diffraction-limited separation between adjacent positions of the possible output beams. The TIR deflector stages provide diffraction-limited output spots of light. In combination, the two sets of deflectors provide bright, diffraction-limited spots of light with a separation between adjacent spot positions small enough to form a fine pattern.

In the preferred embodiment, the spots are formed along a single line in the output plane. Control is exercised over the provision of the laser beam, its vertical position in recording, and the particular horizontal frame location on the printing medium by means of a computer.

DESCRIPTION OF THE PREFERRED EMBODIMENT

Figure 1:
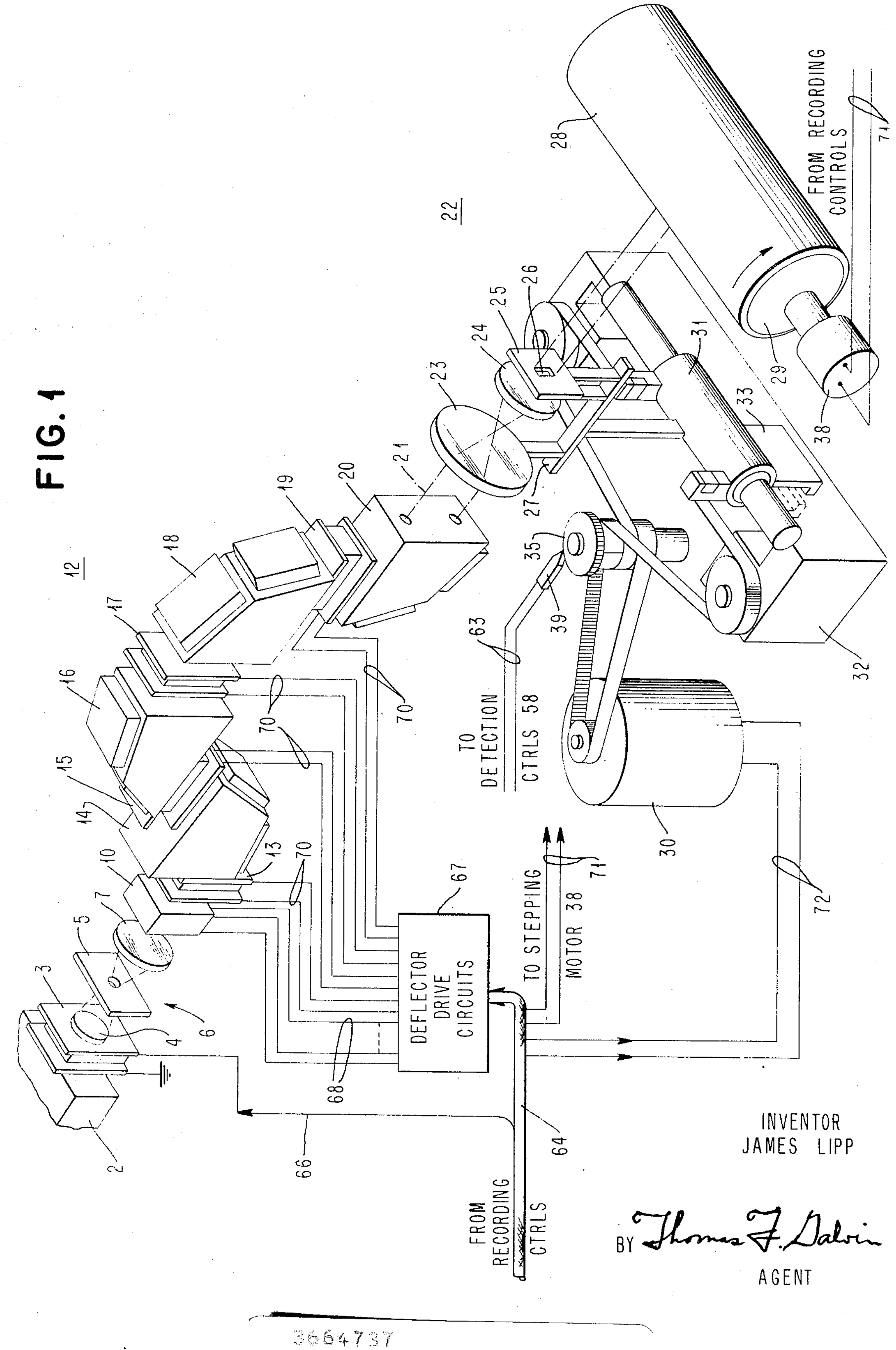
FIG. 1 is a perspective view of the optical recorder of the present invention.

Referring now to FIG. 1, the optical recording system comprises a light source 2, which provides a beam of collimated, linearly polarized light through a modulator to a beam-former 6. The lasser emits light in the actinic (UV) region of the electromagnetic spectrum, the region between .3250 and .4880 mircon being the most useful. In the present embodiment, light source 2 is preferably a helium-cadmium gas laser, although other types may be utilized. To provide for high-efficiency UV transmission, the optical elements are fabricated from quartz materials.

The modulator may comprise an electro-optic switch 3 for controlling the polarization of the light beam and a polarizer and analyzer (not shown in the drawing). This type of modulator is well known to those of skill in this art and has been described in the article "A Fast, Digital Indexed Light Deflector," Kulcke et al., IBM Journal of R&D, January 1964, pp. 64–65. In the present embodiment the modulator acts as a shutter such that when an electrical signal is supplied from suitable recording controls 59 (shown in FIG. 3) through cable connection 64 and line 66 and applied across switch 3, light is permitted to pass to beam-former 6.

The beam-former preferably comprises converging lens 4, pinhole 5 and converging lens 7. This type of beam former is well known to those skilled in this art. It provides a converging beam of spatially filtered light to the input of a light deflector 10. As will be more fully explained hereafter, the focal length of lens 7 equals the optical path of the beam from lens 7 to an output plane located at lens 23. The *f* number of the system is preferably 20 (1.4° half-angle).

Light deflector 10 is preferably a plural stage light deflection apparatus of the split-angle (SA) type which has been described in U.S. Pat. 3,499,700 in the name of Harris et al. This patent has been assigned to the same assignee as this invention.

In this embodiment, deflector 10 comprises four stages and is capable of providing a beam to $2^4=16$ spaced locations at its output. For purposes of this description, each stage of the first plural stage light deflection system 10 may be considered to include an electro-optic polarization control device and a birefringent deflecting device. The electro-optic devices may be formed of potassium dideuterium phosphate ($KD_2PO_4$) crystals having transparent electrodes affixed to their faces. The birefrigent devices may be calcite or other birefringent crystals.

To accomplish the deflection of the light beam, electrical signals are selectively applied through the lines 68 to the transparent electrodes of the electro-optic devices. Deflector drive circuits 67 are connected to cable connection 64 and operate in response to the control signals provided from appropriate recording controls of a computer. The drive circuits may be of the type described in U.S. Pat. 3,492,502 in the same of David C. Chang. This patent has been assigned to the same assignee as this application. The recording controls will be described more fully in a later section of this specification with regard to FIG. 3.

The converging beam from lens 7 is selectively displaced to one of 16 possible output locations in one dimension by deflector 10.

The output light from deflector 10 is transmitted through another 4-stage light deflector 12. Light deflection apparatus 12 comprises light deflectors 14, 16, 18 and 20, having associated with them polarization control devices 13, 15, 17 and 19, respectively. As is the case with deflector apparatus 10, electrical signals selectively applied through lines 70 to the transparent electrodes of the control devices accomplish deflection of the light beam. The four light deflectors, in conjunction with the four light deflectors of apparatus 10, are capable of providing a beam 21 having $2^8=256$ spaced locations at a plane on lens 23. The light deflectors of apparatus 12 have been described fully in prior applications Ser. No. 814,240, filed Apr. 7, 1969 entitled "Light Deflection Apparatus" by M. A. Habegger et al., and Ser. No. 102,574, filed Dec. 30, 1970 entitled "Light Deflection Apparatus" by J. Lipp. Both of these applications are assigned to the assignee of the present application and are hereby incorporated by reference in this application. These deflectors are more fully described with reference to FIG. 2. At this point it should be noted that each of the deflection stages of deflector 12 is capable of providing a truly diffraction-limited beam which is automatically path-length compensated at its output, notwithstanding the number of deflection stages used. Although not illustrated in FIG. 1, it will be understood by those of skill in this art that the light deflection apparatus 10 and 12 are surrounded by a refractive-index-matching dielectric oil.

The output beam 21 may be viewed as a one-dimensional raster of light spots focused at the plane of lens 23. To assure that each possible output beam will be focused at lens 23, it is necessary that the focal length of lens 7 be equal to the optical path traversed by the converging beam from lens 7 through the optical path defined by deflectors 10 and 12 to the plane of the lens 23. Lens 23 is part of a light coupling means 22 which, besides lens 23, comprises a converging lens 24 and an opaque plate 25 having an aperture 26. The elements are mounted on support 27 for reciprocation across a plane defined by the axis of a rotating drum 29. The lens assembly 22 is reciprocated by motor 30 which is driven by a belt system which in turn causes the slidably mounted base 31 to move lens assembly 22 in a plane parallel to the output face of the light deflection assembly. It will be seen that the vertical raster 21 remains at a single fixed location and the light coupling means 22 permits this one-dimensional raster to be scanned across the face of drum 29 which contains a recording medium 28 which is sensitive to the output wavelength of the laser 2.

Lenses 23 and 24 are a pair of converging lenses which serve to enlarge the size of the output raster 21 to a suitable length for printing on a single horizontal line on recording medium 28. The lenses form a simple telescoping arrangement, providing a magnification of from 1:1 to 4:1 of the original height of beam 21 to the height at film 28. The magnification affects the size of the light spots and increases the distance between spots. Such an arrangement thereby serves to reduce the aperture requirements of the light deflection apparatus. This arrangement is well known to those of skill in the art and does not form part of the present invention. Besides changing the length of the raster, the lens system improves the graphic quality of the characters recorded on film 28. Obviously, multi-element lens systems could be used in place of lenses 23 and 24 to further improve the quality of the characters. These kinds of lenses are commercially available and can be used to correct distortion, astigmatism, vignetting or similar problems encountered when a simple lens system is used.

The preferred photosensitive medium 28 is a diazo which is sensitive to the actinic radiation of the laser. Suitable diazo compounds for use on aluminum plates for offset printing are commercially available. For example, the Litho-Chemical and Supply Company of Lynbrook, N.Y., supplies a pre-sensitized offset printing plate with a diazo-sensitized polymer coating by the trade name Kem Lon Pre-Kote. A particularly useful compound is Type "R" diazo which is supplied by Minnesota Mining and Manufacturing Company on an offset printing plate. This compound is very sensitive to the .3250 to .4880 micron radiation emitted by various lasers such as argon-ion, helium-cadmium, krypton-ion, neon and others of a like nature. Those interested in a general treatment of the use of diazos in exposure printing should consult the text Chemistry of Lithography, P. J. Hartsuch, published by Lithographic Technical Foundation, Inc., New York, N.Y., pages 186–197.

Besides diazo compounds, other widely available materials are suitable depending on the recording times desired and the laser wavelength available, e.g. the photographic resists supplied by the Eastman Kodak Company under the trade names KHER, KTFR and KPR–2 may be used. In addition, dichromated colloid layers, diazonium salts on bases of synthetic and natural polymers and aromatic azido compounds can be used.

Returning now to a consideration of the digital light deflector 10, for small numbers of deflection stages, the resolution of the light spots produced at the output is limited primarily by diffraction theory. However, astigmatic aberrations also degrade the resolution. For example, in the split angle transmission type of deflector such as that described in U.S. Pat. 3,499,700 in the name of T. J. Harris et al., astigmatic aberrations occur in one of the two possible output beams from each deflecting stage. The astigmatic aberrations produced by the deflecting elements of these deflectors act on a convergent beam of light to focus the rays imaged in the tangential plane at a different location along the system's longitudinal axis from the rays imaged in the orthogonal sagittal plane.

The two planes correspond to the planes of incidence on an optical element in which the refractions are extreme in their dissimilarity. The tangential plane coincides in the case of the birefringent element with the plane containing the optic axis and the more or less incident principal ray. The rays contained in the tangential plane form a tangential focal line. Rays in the sagittal plane form a sagittal focal line which is orthogonal to the tangential focal line. The longitudinal distance between these two lines is called the astigmatic difference. For an image containing rays in both planes the best focus is obtained on a plane located approximately at the midpoint between the sagittal and tangential focal lines. For an ideal point image that has been deflected and has incurred astigmatic aberrations, the diameter of this image, which may be defined as the image of least confusion, is determined by the product of the astigmatic difference and the maximum angle between the principal ray and any one of the converging rays in the light bundle.

In transmission type of light deflectors, astigmatic aberrations are introduced into the focus of the output beam when the beam is projected through the birefringent element as a set of extraordinary rays even when the principal ray is at a normal incidence of the face of the plate.

These astigmatic aberrations become more apparent as the number of stages increases. In practice, if the path length of a number of deflection stages is kept low, astigmatic aberrations are not a significant factor. It has been determined that if not more than four stages are used astigmatic aberrations pose no problem. At least one must be used; but fewer than four stages may be used, depending on the number of the desired positions desired in the output raster and the quality of the pattern to be formed on the photosensitive medium.

Figure 2:
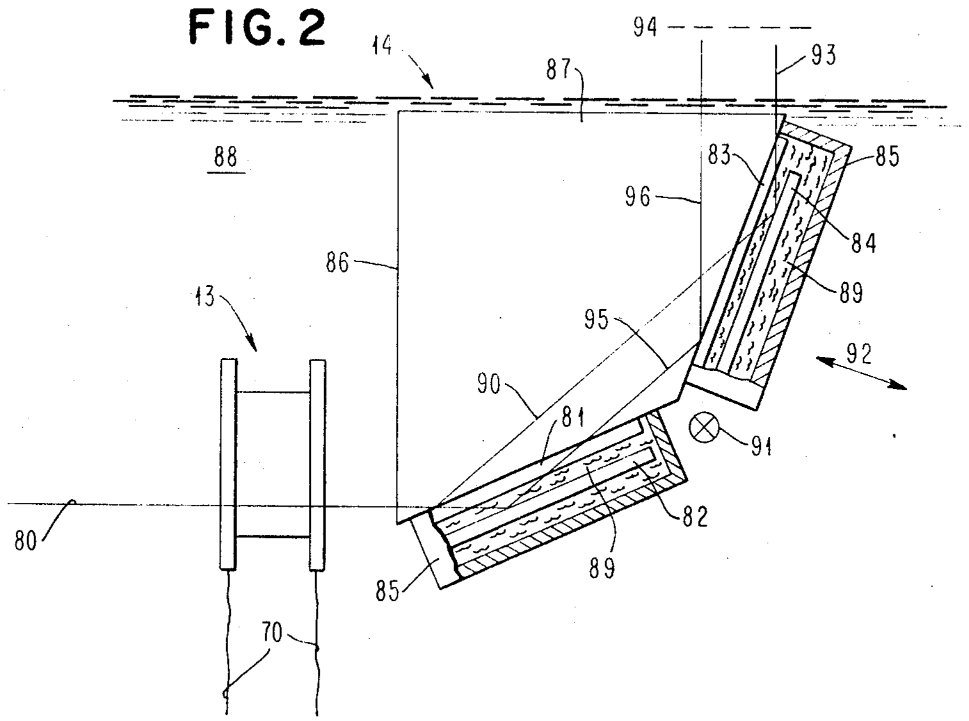
FIG. 2 is a side view of a single TIR-type light deflecting element used in the digital light deflector of the optical recorder.

Referring now to FIG. 2, there is shown a side view of a single (TIR) light deflection stage of the plural stage apparatus 12 of FIG. 1. For purposes of illustration, light deflector 14 and the associated polarization control element 13 will be explained in detail and it will be understood that the operation of deflectors 16, 18 and 20 and their associated polarization elements in FIG. 1 function in the same manner. The embodiment of the element to be described hereinafter is not itself the inventive subject matter of the present invention. This element has been described previously in application Ser. No. 814,240 filed Apr. 7, 1969, entitled "Light Deflection Apparatus" by M. A. Habegger et al. An improved version is described in application Ser. No. 102,574, filed Dec. 30, 1970 entitled "Light Deflection Apparatus," by J. Lipp, both of these applications being assigned to the assignee of the present application. These applications are incorporated by reference in the present application.

This TIR light deflector eliminates astigmatic aberrations which have been associated with other digital light deflectors and achieves pathlength compensation. In contrast to prior art devices, the light deflector shown in FIG. 2 is free of any astigmatic aberrations, thereby providing a diffraction-limited output beam. As discussed previously, however, TIR deflectors cannot comprise the entire deflection means in a high quality exposure printing system. The separation between adjacent beam positions is too large to provide a fine pattern in a practical system.

As described in application Ser. No. 814,240, referred to above, each light deflection stage is formed of two pairs of birefringent and isotropic element combinations. The first birefringent element is located at an angle greater than the critical angle for the element with respect to the angle of the principal ray of the incident light beam. An isotropic element is disposed behind the rear face of the birefringent element. A refractive-index matching oil permeates and encloses the entire system of light deflectors and polarization control elements.

The incident beam encountering the higher index of refraction of this first birefringent element is transmitted through it and is reflected at the incident face of the isotropic element. The beam encountering the lower index of refraction of the birefringent element is reflected at the incident face of the birefringent element and never enters it. The second birefringent plate is positioned in the path of these reflected beams and has its optic axis normal to the optic axis of the first birefringent element. Thus, a beam transmitted through the first birefringent element and reflected at the isotropic element is reflected as an extraordinary beam at the incident face of the second birefringent element. Conversely, the beam reflected at the incident face of the first birefringent element acts as the ordinary beam and passes through the second birefringent element and is reflected at the incident face of the isotropic element associated with the second birefringent element. The outputs are provided in paths substantially parallel to one another and in very close proximity to one another. The deflections between the possible output beams depend not on the absolute thicknesses of the birefringent elements but on the relative spacings between the incident faces of the birefringent elements and the incident faces of the isotropic elements. The outputs are also provided in the same focal plane and are therefore pathlength-compensated.

The use of such light deflectors enables the system to deflect images with substantially higher resolution than that obtainable using prior art light deflectors. The resolution is limited only by the deflector's numeric aperture.

Application Ser. No. 102,574 referred to above improves on the above invention. In that application it is noted that the preferred refractive-index matching oil has a tendency to break down when exposed to high potentials generated in the electro-optic switches. To eliminate breakdown, the liquid is confined between the birefringent and isotropic elements within a container and insulated from the switching voltages. Another liquid with good dielectric properties such as silicone oil, surrounds the rest of the system for matching the refractive indices of the polarization control elements. The container structure includes adjustment means for precisely varying the distance and angle of each isotropic element with respect to each birefringent element.

The preferred light deflection stage shown in FIG. 2 provides for deflecting a converging beam of light 80 from a source to either of two possible closely positioned output locations on a target 94. The apparatus is formed of two pairs of birefringent elements 81 and 83 and isotropic elements 82 and 84 associated with the birefringent elements. The optic axes of birefringent plates 81 and 83 are disposed in directions normal to each other. Birefringent element 81 is located at an angle greater than the critical angle for the element with respect to the angle of the principal ray of the incident light beam 80. Isotropic element 82 is disposed behind the rear face of birefringent element 81.

The incident beam first encounters a polarization control element 13 which acts to present a light beam having a linear polarization in one of two mutually orthogonal states. As previously discussed, a typical polarization control element may take the form of $KD_2PO_4$, having suitable transparent electrodes affixed to its surfaces. In one condition, when the $KD_2PO_4$ crystal is deactivated, the polarization of an incident light beam remains unaffected. When the crystal is activated by applying a voltage through lines 70 between the electrodes that is related to the wavelength of the light, the crystal rotates the polarization state to the mutually orthogonal state. The deflecting stage 14 responds to polarization of the incident light beam to provide one of two possible output beams.

Thus, light beam 80 is provided to the first deflecting element 81 through oil bath 88 and front surface 86 of prism 87. The entire assembly shown in FIG. 2 is surrounded by the oil bath 88 which may be a silicon oil which matches the index of fraction of the plates of element 13. The oil bath has a high dielectric constant so as not to be affected by the high voltage across the plates of elements 13. The oil bath and the prism 87 function to provide a non-refracting path for the incident light beam 80 as it enters and exits from the light deflection elements.

Both set of birefringent and isotropic elements are enclosed by containers 85 which contain a liquid 89 which closely matches the high refractive index of the birefringent elements. The oil, preferably a polychlorinated polyphenyl, has dielectric properties which are insufficient to withstand high voltages and high switching rates applied to polarization control element 13. Each container also includes means (not shown) for precisely adjusting the isotropic element axially and angularly with respect to the birefringent element.

In operation, a light beam 80 is provided to the deflecting stage at an angle of incidence that is greater than the critical angle for the particular birefringent crystals 81 and 83. When beam 80 has a polarization that is in a plane corresponding to the plane of the optic axis of element 81, that is, in a plane perpendicular to the plane of the drawing, it encounters the lower index of refraction of element 81. Such a beam is reflected at incident face of element 81 as beam 90. It follows a path toward birefringent element 83, which is displaced from isotropic element 84 and positioned in spaced-apart, parallel relationship to it. If the optic axis 92 of element 83 is in a normal position to the optic axis 91 of element 81, beam 90 encounters the higher index of refraction of element 83 and passes through it without any refraction to encounter the incident face of isotropic plate 84. It is then deflected as beam 93 in a path substantially perpendicular to the path of the incident beam 80. An output spot is provided at output plane 94.

In similar manner, if the polarization of the incident beam 80 is in a plane perpendicular to the plane of optic axis 91 of element 81, that is, in a plane parallel to the plane of the drawing, it encounters the higher index of refraction of element 81 and passes through it to isotropic element 82 where the beam is reflected as beam 95 toward birefringent element 83. Since optic axis 92 of element 83 is in a normal direction to optic axis 91, beam 90 encounters the lower index of refraction of element 93 and is reflected as beam 96 at the incident face of element 83 to provide another output spot of light at plane 94.

As taught in application Ser. No. 814,240 by M. A. Habegger et al., the above discussed light deflector enables the light beam to be propagated as a set of extraordinary rays at the birefringent element which never traverses these elements, but is reflected at their incident faces. This eliminates completely astigmatism in the output beams in addition to other advantages. Consequently, the output beams are essentially diffraction-limited for any number of stages.

Figure 3:
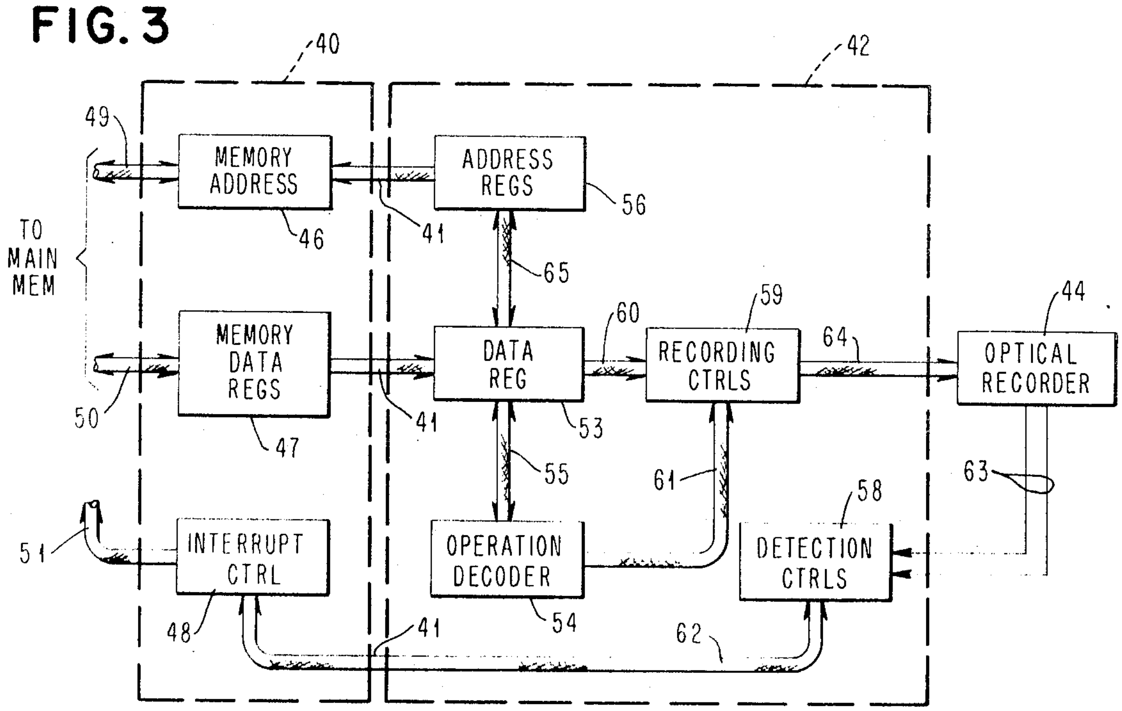
FIG. 3 is a block diagram of the computer control system utilized in the recording process.

To generate the presence or absence of a light spot, control is exercised over the light beam by information acted on by a computer illustrated in FIG. 3. This information is fed to the computer from suitable storage devices. The optical recording is accomplished with a computer controlled system operating through its storage access channel to an access and control unit which connects to the optical recorder. Upon the initiation of the command START regeneration of information, the computer draws on its main storage to provide the commands and controls necessary for performing the operation as well as the actual information to be recorded. Control is exercised over the provision of the laser beam, its vertical position in recording and the particular horizontal frame location on the printing medium through the control and information signal provided from the computer.

Referring now to FIG. 3, the optical recording process takes place under the control of a general purpose computer. The central processing unit (CPU) 40 of the computer is connected through the storage access channel 41 to an access and control unit 42. The central processing unit also is connected to the main memory of the computer which may be any suitable type of storage arrangement employed in computers.

Access and control unit 42 may be considered to be a programmable switch accepting the information to be recorded as well as the control and logic signals for accomplishing the recording.

The computer CPU 40 is shown in simplified form as including only memory address circuits 46, memory data registers 47 and an interrupt control 48. These circuits are connected to the main memory of the computer through the connections 49, 50, 51, respectively. Registers 47 connect bi-directionally with a data register 53 in control unit 42 through access channel 41. All information and control signals from the main memory are provided to unit 42 through connection 50 and registers 47. The operation information is coupled to an operation decoder 54 through connection 55; and the address information to address registers 56 through connection 65.

Control unit 42 also comprises recording controls 59 for accomplishing the recording of the information. The input signals to controls 59 are provided for the information through connection 60. Controls 59 are connected to optical recorder 44 through connection 64.

Controls for re-entry into the computer and for detection of the position of the reciprocating means with respect to the recording drum 29 are provided at 58. The information detection from recorder 44 is provided through the connection 63. Detection controls 58 act through connection 62 of storage access channel 41 to control the interruption of the flow of information at Interrupt Control 48 in CPU 40.

As already described, the computer utilized to accomplish the control of the recording of information is a general purpose computer. It may be the IBM System 1130. Such a system is a binary computing system designed for general purpose computing. It has a data word of 16 bits plus 2 parity bits. It includes three index registers and operates on indirect addressing. Its access channels provide for a high speed cycle-stealing mode of operation requiring low usage of the CPU time when it is used with I/O storage devices.

Recorder 44 has been described in detail with respect to FIG. 1. The control signals as well as the actual information signals are supplied through connection 64 from recording controls 59.

OPERATION OF THE INVENTION

The operation can best be understood by referring to FIGS. 1 and 3.

The operation begins with a START command from the CPU 40 of the computer. Accessing of the main memory of the computer continues uninterrupted providing the data and control information through the data register 53 and decoder 54 to the recording controls 59.

To gate the information for recording, control signals are provided through connection 54 to the recorder 44 to activate modulator 3, thereby allowing light to impinge on deflector unit 10 through beam former 6.

Drum 29 containing photosensitive medium 28 is advanced by stepping motor 38 so that a desired horizontal line on the photosensitive medium lies in the plane traversed by lens assembly 22. Recording controls 59 then starts motor 30 through connection 64 and line 72. Motor 30 steps lens assembly 22, a column at a time horizontally across the face of drum 29. Concurrently, the recording of the data occurs under the control of the deflector drive circuits 67.

The light deflector preferably acts in a scanning manner over the 256 discrete output locations in one column, with the recording controls specifying whether or not the individual locations receive a beam of light. Alternatively, the scanning may be done in random fashion over the 256 position line.

After one column on film 28 is scanned, lens assembly 22 moves one horizontal position to the next column. The process continues until a horizontal line contains the desired characters. The end of the line is sensed by sensing means 39 and a pulse is fed back through connection 63 to detection controls 58 of control unit 42. This causes interrupt control 48 in CPU 40 to momentarily halt the data drawn from the main memory of the computer. Recording controls 59 automatically stop and reverse drive motor 30 and increment the drum 29 by means of stepping motor 38 through connection 71 preparatory to recording the next line of characters. Of course, the next line could be written on the return of lens assembly 22 but there is little to be gained in overall speed. If desired, motor 30 can be continuously running and reversing as long as primary power is on the machine and separate controls for incrementing the drum 29 under control of a computer generated command can be used. However, the latter arrangement would require some means for indicating the lens position to the computer if bidirectional printing is to be used.

In FIG. 1, a portion of mounting plate 32 supporting the shaft on which base 31 slides is depicted cut away to illustrate how dogs such as 33 hold lens assembly 22 in the desired plane. Disc 35 causes pulses to be picked up by detector 39 which indicates the rotary movement of the shaft on which it is mounted. This serves to indicate the point on film 28 at which the characters are being displayed. The information is fed back through connection 63 to detection control 58 of the control unit 42 in FIG. 3. At the end of a line, detection controls 58 act through connection 62 to control the interruption of the flow of information at 48 in CPU 40.

The detection controls may be designed to provide other features as well. For example, it may be desired to detect the information being recorded on film 28 substantially concurrently with the recording. To accomplish this purpose a deflecting element such as beam splitter may be provided in the output path of light deflector 12. The beam splitter is selected to permit a small portion of the light to be deflected out of the path for detection and display at suitable display device. The display device may be a commercially available unit such as IBM 2250 Display Unit Model 4. This is a CRT unit which displays information as an output in alpha-numeric and graphic form. An operator viewing the display device checks the character formation. By using a manual entry keyboard, the operator can interrupt the recording through detection controls 58. No change can be made on film 28 but significant errors can be detected at an early stage and the data in the main memory regenerated for use on a new recording.

Figure 4A:
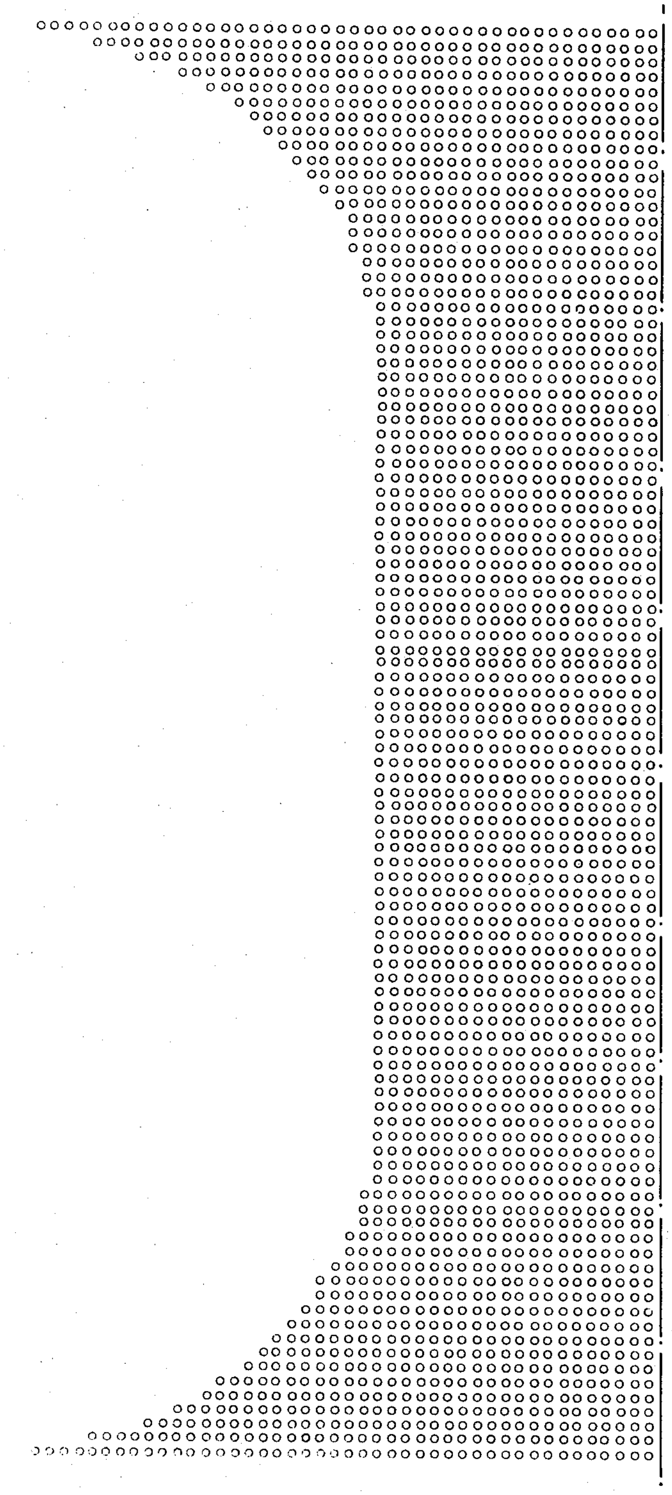
FIGS. 4*a* and 4*b* illustrates how characters can be defined by a sequence of light spots which expose a photosensitive medium.
Figure 4B:
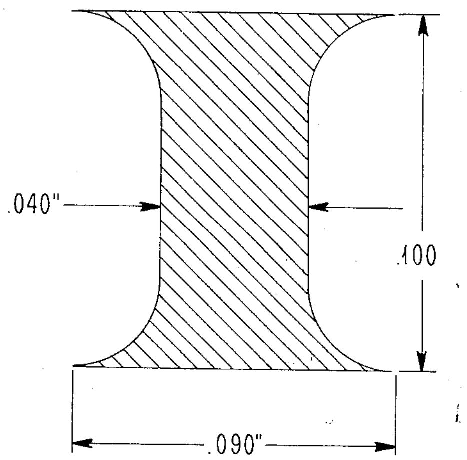

FIGS. 4A and 4B illustrate a typical character which can be formed on a photosensitive medium in accordance with the present invention.

In FIG. 4A a vertical raster of 100 output locations on the photosensitive medium is assumed to be required for the production of a character size shown in FIG. 4B. It will be understood that this is for illustrative purposes only; more or fewer output spots could be utilized. The critical fact is that each spot is separated by 25 microns. Each spot is formed by a diffraction-limited input light beam of 20 microns diameter. For ease of illustration only the periphery of each spot is depicted; in fact, each spot has a uniform appearance. The character in FIG. 4A is produced by a vertical, continuous scan of one horizontal position on the film. At the completion of this scan the film is stepped one space and the scan is initiated for that space, and so forth. The spacings are provided by sequentially deflecting the beam at each location through a vertical raster. The presence of a light spot indicates that the light deflectors transmitted a beam; the absence of a light spot indicates that the beam was not transmitted. Obviously, the mechanics of the light deflectors also allow the beam to be deflected at random along a single vertical line.

FIG. 4B shows the quality of a character viewed by the eye at a reading distance from the developed film. As compared to prior art systems this image is of extremely high quality and definition.

While the invention has been particularly shown and described with reference to a preferred embodiment thereof, it will be understood by those skilled in the art that various changes in form and detail may be made therein without departing from the spirit and scope of the invention. For example, the particular designs of the reciprocating means and the computer controls are not critical; other means for performing their functions might be found useful.

What is claimed is:

1. A printing plate recording system comprising:
- a source of a convergent, polarized light beam having an actinic wavelength;
- digital light deflection means for selectively deflecting the light beam into one of a number of discrete points along a line located at the focal plane of the beam, said light deflection means comprising:
  - first and second sets of aligned, cascaded light deflection stages, each stage including means for selectively rotating the polarization of the beam of light transmitted therethrough into one of two mutually orthogonal planes and means for transmitting the beam of light along one of two different paths dependent on the plane of polarization of the light;
  - said first set comprising at least one stage for defining a diffraction-limited separation between the possible paths of the light beam through the transmission means;
  - said second set for deflecting the light beam in astigmatic-abberation-free form to selected points along said line;
  - whereby the spots of light provided along said line are separated by a finite distance and each spot in diffraction-limited; and
- a photosensitive medium, located along the optical path traversed by said diffraction-limited spots of light, said medium capable of undergoing a photochemical reaction when exposed to the actinic light beam.

2. A recording system as in claim 1 further comprising:

- light coupling means for reciprocating orthogonally with respect to said line and for exposing the selectively deflected light beam transversely across the medium.

3. A recording system as in claim 2 wherein said light coupling means includes telescopic lens means disposed between said focal plane and said photosensitive medium for magnifying the separation between each output spot location of said deflected beam.

4. A recording system as in claim 2 further comprising computer means having a central processing unit and storage means for storing information to be recorded, and including:
- means for controlling the provision of said light source to said light deflection means;
- means for operating each stage of said light deflection means thereby providing a light beam at a selected location along said line at the focal plane of the beam;
- means for controlling the reciprocation of said light coupling means; and
- sensing means for determining the position of said light coupling means with respect to the photosensitive medium.

5. A recording system as in claim 1 wherein said set of deflection stages for providing astigmatic-aberration-free light beam comprises:
- polarization control means for selectively controlling the polarization of the light beam;
- a two section light deflector for selectively deflecting the light beam propagated by the control means, each section comprising:
  - birefringent means having an incident surface disposed to encounter an incident light beam;
  - isotropic alignment means having a reflective surface in spaced-apart, parallel, substantially coextensive relationship with the incident surface of the birefringent means;
  - the birefringent means of the first section disposed to encounter a light beam from the polarization control element for deflecting a beam at its incident face into a first path when the beam has one of two mutually orthogonal polarization states and for transmitting a beam through the alignment means for deflection into a second path when the beam has the other of said mutually orthogonal polarization states;
  - the birefringent means of the second section being arranged in both of the first and second paths for transmitting the beam in the first path for redeflection by the alignment means of the second section to one of two selected locations and for redeflecting the beam in the second path at its incident face to the other of said selected locations; and
  - means for providing a non-refracting path through each deflection stage for the polarized light beam as propagated, whereby both light beams encounter material of the same index of refraction.

6. A recording system as in claim 5 wherein said means for providing a non-refracting path for the light beam comprises:
- first liquid means for providing a non-refracting path for the light beam as propagated by the polarization control means, said first liquid having good dielectric properties for withstanding voltages developed by the control means and having an index of refraction corresponding to the refractive index of the control means;
- a second liquid having an index of refraction corresponding to the refractive index of the birefringent means, said second liquid having poor dielectric properties;
- means for confining the second liquid between each birefringent and alignment means and for insulating the second liquid from voltages applied to the polarization control elements; and means for providing a non-refracting path for the propagated light beam between the first liquid means and each two-section light deflector.

7. Light deflection apparatus as in claim 6 wherein the means for providing a non-refracting path between the first liquid means and each two-section light deflector is a transparent body contained in each deflection stage having a first surface disposed normal to the propagated light beam, second and third surfaces abutting the incident surfaces of the birefringent means of the first and second sections of the two-section light deflector, respectively, and a fourth surface for transmitting light deflected by the two-section light deflector.

8. A recording system as in claim 1 wherein each stage of said first set of deflectors is a split-angle deflector.

9. A recording system as in claim 1 wherein the photosensitive medium is a diazo compound sensitive to light in the actinic region.

10. A recording system as in claim 1 wherein the light source is a laser having an output wavelength in the region between .3250 microns and .4880 microns.

11. A recording system as in claim 10 wherein the light source is a gas laser.

12. A recording system as in claim 11 wherein the gas is selected from the group consisting of helium-cadmium, argon-ion, krypton-ion an neon.

References Cited

UNITED STATES PATENTS

| | | | |
|---|---|---|---|
| 3,314,073 | 4/1967 | Becker | 346—76 L |
| 3,391,972 | 7/1968 | Harris et al. | 350—150 |
| 3,455,239 | 7/1969 | Smith | 101—395 |
| 3,474,457 | 10/1969 | Becker | 346—76 L |
| 3,492,072 | 1/1970 | Haun, Jr. | 355—78 |
| 3,506,779 | 4/1970 | Brown et al. | 95—4.5 R |
| 3,517,592 | 6/1970 | Kollar | 95—4.5 R |
| 3,573,847 | 4/1971 | Sacerdoti | 95—4.5 R |

OTHER REFERENCES

Roshon et al., IBM Technical Disclosure Bulletin, August 1964, vol. 7, No. 3, p. 224.

SAMUEL S. MATTHEWS, Primary Examiner

R. A. WINTERCORN, Assistant Examiner

U.S. Cl. X.R.

95—4.5 R; 101—395; 346—76 L, 107 R; 350—150; 355—78